(12) United States Patent
Axinte et al.

(10) Patent No.: US 11,616,939 B2
(45) Date of Patent: Mar. 28, 2023

(54) INSPECTION SYSTEM

(71) Applicant: ROLLS-ROYCE plc, London (GB)

(72) Inventors: Dragos A Axinte, Derby (GB); Xin Dong, Derby (GB); David Alatorre Troncoso, Derby (GB); Erhui Sun, Derby (GB); James Kell, Derby (GB)

(73) Assignee: ROLLS-ROYCE plc, London (GB)

( * ) Notice: Subject to any disclaimer, the term of this patent is extended or adjusted under 35 U.S.C. 154(b) by 265 days.

(21) Appl. No.: 17/035,928

(22) Filed: Sep. 29, 2020

(65) Prior Publication Data
US 2021/0112235 A1    Apr. 15, 2021

(30) Foreign Application Priority Data
Oct. 10, 2019 (GB) ...................... 1914638

(51) Int. Cl.
*G06T 7/80* (2017.01)
*H04N 13/239* (2018.01)
(Continued)

(52) U.S. Cl.
CPC .......... *H04N 13/239* (2018.05); *G01M 15/02* (2013.01); *G01M 15/14* (2013.01); *G06T 7/80* (2017.01); *H04N 7/181* (2013.01); *H04N 23/54* (2023.01); *G06T 2207/30204* (2013.01); *H04N 23/555* (2023.01)

(58) Field of Classification Search
CPC .. H04N 2005/2255; G06T 2207/10021; G06T 2207/10048; G06T 2207/10068; G06T 2207/10132; G06T 7/593; G06T 2207/30164; G06T 7/0004; G06T 7/0012; G01B 2210/52; G01B 11/245; G01M 5/0091; G01M 11/081; G06F 3/014; B64F 5/40; B64F 5/60; G01N 21/84
See application file for complete search history.

(56) References Cited

U.S. PATENT DOCUMENTS

| 9,126,243 B2 | 9/2015 | Ramhorst |
| 2010/0256461 A1 | 10/2010 | Mohamedali et al. |

(Continued)

FOREIGN PATENT DOCUMENTS

| WO | 2008/131557 A1 | 11/2008 |
| WO | 2008131557 A1 | 11/2008 |

OTHER PUBLICATIONS

Feb. 16, 2021 Extended Search Report issued in European Patent Application No. 20195930.1.
(Continued)

*Primary Examiner* — Shawn S An
(74) *Attorney, Agent, or Firm* — Oliff PLC

(57) ABSTRACT

An inspection system for mounting on a user's hand. The inspection system comprising: an imaging unit comprising two sub-units, the first sub-unit being configured to provide images from a first point of view and the second sub-unit being configured to provide images from a second point of view; and a measuring unit configured to provide data relating to a physical property measured at a measurement location on the user's hand. The imaging unit has a separation sensor configured to measure the separation between the two sub-units of the imaging unit. A method of inspecting and/or servicing a machine is also disclosed.

19 Claims, 8 Drawing Sheets

(51) Int. Cl.
*G01M 15/02* (2006.01)
*G01M 15/14* (2006.01)
*H04N 7/18* (2006.01)
*H04N 23/54* (2023.01)
*H04N 23/50* (2023.01)

(56) References Cited

U.S. PATENT DOCUMENTS

| | | |
|---|---|---|
| 2011/0191935 A1 | 8/2011 | Schneider |
| 2016/0171907 A1 | 6/2016 | Moore et al. |
| 2016/0246369 A1* | 8/2016 | Osman .................. A63F 13/212 |
| 2016/0313798 A1 | 10/2016 | Connor |
| 2017/0102775 A1 | 4/2017 | Keller et al. |
| 2018/0074637 A1* | 3/2018 | Rosenberg .............. G06F 3/045 |
| 2018/0092698 A1* | 4/2018 | Chopra .................. A61B 90/39 |
| 2018/0328808 A1 | 11/2018 | Jourdan et al. |
| 2019/0049392 A1* | 2/2019 | Ruggiero ........... H04N 5/23293 |
| 2019/0094981 A1* | 3/2019 | Bradski ................ H04N 13/344 |
| 2019/0346940 A1* | 11/2019 | Keller ................... G06F 3/0346 |
| 2020/0026352 A1* | 1/2020 | Wang ...................... G06F 3/016 |
| 2020/0045953 A1* | 2/2020 | Serrat ................. A01M 9/0092 |
| 2020/0174566 A1* | 6/2020 | Klein .................... A63F 13/212 |
| 2020/0260994 A1* | 8/2020 | Cunningham ........ A61B 5/1116 |
| 2021/0272086 A1* | 9/2021 | Buibas .................. G06Q 30/06 |

OTHER PUBLICATIONS

Youtube. "TWiT Tech Podcast Network: DXG-5F9V 3D Camera Review" https://www.youtube.com/watch?v=WJ7119si6hA, Nov. 8, 2011, p. 1.
"DXG-5F9V 3D Camera Review," TWiT Tech Podcast Network, dated Nov. 8, 2011, retrieved from the Internet URL: https://www.youtube.com/watch?v=WJ7119si6hA, on Sep. 28, 2020, p. 1-1.
Search Report of the Intellectual Property Office of the United Kingdom for GB1820117.8 dated Jun. 11, 2019.
Search Report of the Intellectual Property Office of the United Kingdom for GB1914638.0 dated Jul. 14, 2020.

* cited by examiner

INSPECTION SYSTEM

CROSS-REFERENCE TO RELATED APPLICATIONS

This specification is based upon and claims the benefit of priority from United Kingdom patent application number GB 1914638.0 filed on Oct. 10 2019, the entire contents of which is incorporated herein by reference.

BACKGROUND

Field of the Disclosure

The present disclosure relates to the provision of an inspection system suitable for use in inspection and/or measurement in difficult-to-access environments, such as gas turbine engines and/or engines provided to aircraft.

Description of the Related Art

There are scenarios in which it is necessary to inspect areas inside machinery or in a human body. The area to be inspected may be confined and difficult to access. More particularly, it is often not possible to have line-of-sight access to the area to be inspected. Therefore, indirect means of inspecting the area may be used.

For example, it has been known to use an endoscope to view areas that are not easily accessible. However, endoscopes have limitations. For example, endoscopes typically have a low stiffness, which makes them unsuited to be steered over long distances. Endoscopes may also have limited mobility.

SUMMARY OF THE DISCLOSURE

According to a first aspect there is provided an inspection system for mounting on a user's hand, the inspection system comprising: an imaging unit comprising two sub-units, the first sub-unit being configured to provide images from a first point of view and the second sub-unit being configured to provide images from a second point of view; and a measuring unit configured to provide data relating to a physical property measured at a measurement location on the user's hand; wherein the imaging unit has a separation sensor configured to measure the separation between the two sub-units of the imaging unit.

In some embodiments the at least two sub-units are a different type from each other.

In some embodiments the imaging unit may be configured such that the optical axes of the sub-units of the imaging unit are substantially parallel.

In some embodiments the separation sensor may comprise two contact pads, each of the contact pads may have a contact surface which may be substantially fixedly positioned at a respective known displacement relative to a respective sub-unit of the imaging unit; and wherein, when the two contact surfaces are brought into contact with each other, the separation between the two sub-units of the imaging unit may be determined by the sum of the known displacements between the contact surfaces and the respective sub-units of the imaging unit.

In some embodiments the contact pads of the separation sensor may be magnetically attracted to each other.

In some embodiments the separation sensor may be configured to sense whether the two contact surfaces are in contact.

In some embodiments the imaging unit may be configured to: when the separation sensor (64) senses that the two contact surfaces are in contact, output a stereographic image based on the images provided by the imaging unit; and/or when the separation sensor senses that the two contact surfaces are not in contact, combine an image provided by one sub-unit of the imaging unit with that provided by the other sub-unit of the imaging unit to produce a combined image with an enlarged field of view.

In some embodiments the separation sensor may comprise a camera that may be substantially fixedly positioned at a known displacement relative to one of the sub-units of the imaging unit, and a fiducial marker may be substantially fixedly positioned at another known displacement relative to the other of the sub-units; and wherein, when the fiducial marker may be within the field of view of the camera of the separation sensor, the separation sensor may be configured to compute the separation between the two sub-units of the imaging unit based on an image of the fiducial marker captured by the camera.

In some embodiments the separation sensor may comprises two inertial measurement units, each inertial measurement unit being substantially fixedly positioned relative to a respective sub-unit (701) of the imaging unit; and wherein the separation sensor may be configured to compute the separation between the two sub-units of the imaging unit based on the output of the two inertial measurement units.

In some embodiments the imaging unit may be configured to: when the separation between the two sub-units of the imaging unit is less than a predetermined threshold, output a stereographic image based on the images provided by the imaging unit; and/or when the separation between the two sub-units of the imaging unit is no less than the predetermined threshold, combine the images provided by one sub-unit of the imaging unit with those provided by the other sub-unit of the imaging unit to produce a combined image with an enlarged field of view.

In some embodiments the imaging unit may comprise more than two sub-units that may be configured to provide images from different points of view, and the separation sensor may be configured to measure more than one separation amongst the sub-units of the imaging unit.

In some embodiments the inspection system may be configured to compute, based on the images provided by the two sub-units of the imaging unit, a dimension of an object or between objects captured in the images.

In some embodiments the inspection system may be configured to compute, based on the images provided by the two sub-units, a three-dimensional map of the space captured in the images.

In some embodiments each sub-unit of the imaging unit may comprise at least one of: a camera, a 360° camera, a wavelength filtered camera, a thermal camera, a zoom camera, a macro camera, a stereo camera, a dichroic camera, and an ultrasound receiver.

In some embodiments the measuring unit may comprise at least one of: a sensor that may be configured to measure a temperature at a measurement location on a user's hand; a sensor that may be configured to measure a force exerted on a measurement location on a user's hand; a sensor that may be configured to measure the acceleration of a measurement location on a user's hand; a sensor that may be configured to measure the position of a measurement location on a user's hand; a sensor that may be configured to measure ionizing radiation at a measurement location on a user's hand; a sensor that may be configured to measure at least one of the direction and strength of a magnetic field and/or an electric field at a measurement location on a user's hand; a sensor that may be configured to measure an eddy current in a material in proximity to a measurement location on a user's hand; a sensor that may be configured to detect sound waves at a measurement location on a user's hand; a sensor that may be configured to measure the separation between two measurement locations on a user's hand; and a sensor that may be configured to measure at least one of the voltage, electric current and the electrical resistance between two measurement locations on a user's hand.

In some embodiments the measuring unit may include a sensor that may be configured to provide a measurement between two measurement locations, each of the two measurement locations may be located on a digit of the user's hand, a tip of a digit of the user's hand, on the phalanges of a digit of a user's hand, on the palm of the user's hand or on the back of the user's hand.

In some embodiments the inspection system may further comprise: a fluid dispensing unit that may be configured to supply a fluid from at least one dispensing location located on the user's hand; a fluid absorbing unit that may be configured to absorb fluid at a location on at least one of a digit of the user's hand, a tip of a digit of the user's hand, on the phalanges of a digit of a user's hand, the palm of the user's hand and the back of the user's hand; and/or at least one illuminator that may be configured to emit at least one of visible light, infrared and ultraviolet radiation.

In some embodiments the at least one dispensing location may be located on a digit of the user's hand, on a tip of a digit of the user's hand, on the phalanges of a digit of a user's hand, on the palm of the user's hand or on the back of the user's hand.

In some embodiments the fluid dispensing unit may be configured to supply at least one of oil, a liquid penetrant, an air jet and a water jet.

In some embodiments the illuminator may located on a digit of the user's hand, at the tip of a digit of the user's hand, on the phalanges of a digit of a user's hand, on the palm of the user's hand or on the back of the user's hand.

In some embodiments the inspection system may further comprise a controller, which may be configured to receive data from at least one of the imaging unit and the measuring unit and to output corresponding information to a user interface.

In some embodiments the user interface may comprise a display that may be configured to display an image based on data from the imaging unit, the display may be stereographic, mountable on a user's head, an augmented reality display, and/or it may be configured to display dimensional information on the display.

In some embodiments the inspection system may comprise a covering that encapsulates the user's hand.

In some embodiments the covering may extend to encapsulate at least a part of the forearm of the user and, optionally, at least a part of the upper arm of the user.

In some embodiments the covering may be formed from a material that is at least one of fluid impermeable, gas impermeable, thermally resistant, electrically resistant and puncture resistant.

In some embodiments the inspection system may be configured for use within a machine, and it may be for use with an aircraft propulsion system and/or a gas turbine engine or a hybrid gas/electric propulsion system.

In some embodiments the inspection system may be configured for use within a human or animal body.

In a second aspect the present disclosure provides a method of inspecting and/or servicing a machine, optionally an aircraft engine, the method comprising the steps of: mounting the inspection system of the first aspect on a user's hand; and inserting the user's hand into the machine to inspect and/or service the machine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
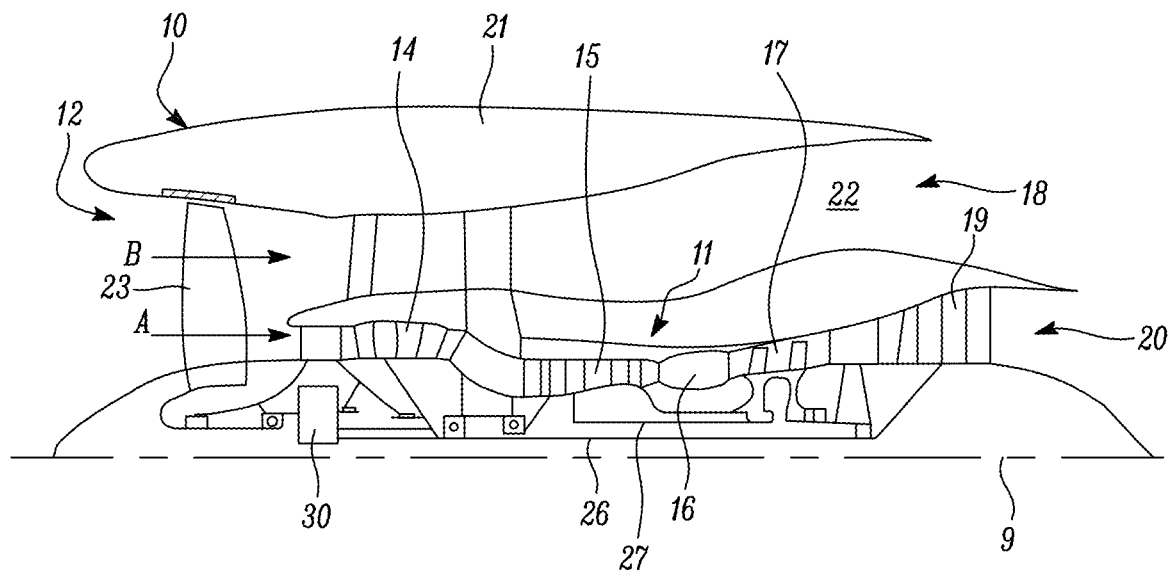
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
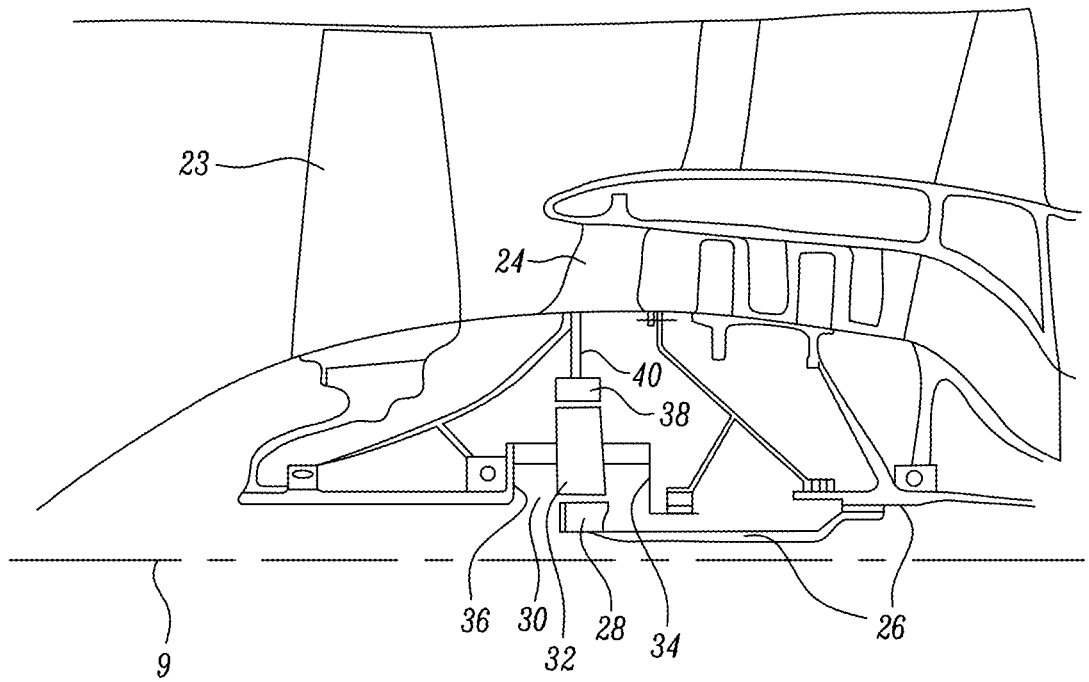
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
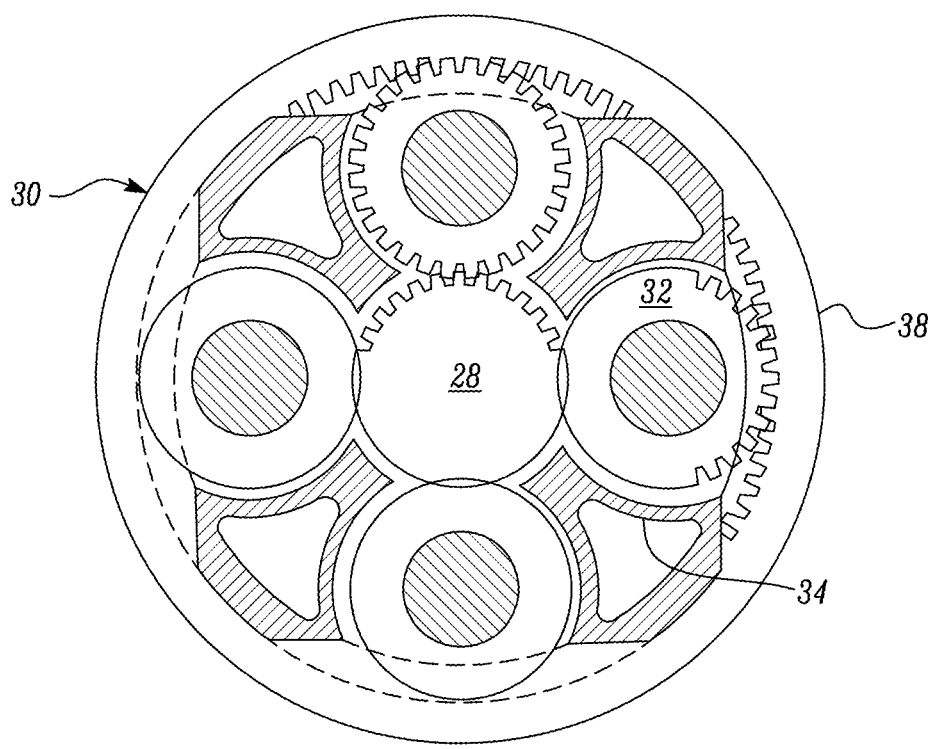
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The present disclosure provides an inspection system for mounting to a user's hand, i.e. it is hand-mountable or, in use, is hand-mounted. It may include a variety of units that are mounted to the user's hand. Such an arrangement may therefore exploit the versatility of human hands and arms in order to gain access to locations that are hard to reach. Such an arrangement may also be more intuitive to a user and/or easier to control than, for example, an endoscope. Endoscopes may have limitations due to their poor stiffness, which makes them difficult to steer over long distances, and limiting mobility. Such an arrangement may also benefit from the experience of expert technicians and engineers, in effect extending their senses.

The inspection system has at least one imaging unit and at least one measuring unit. The imaging unit is configured to provide images from at least one point of view located on the user's hand and the measuring unit is configured to provide data relating to a physical property measured at a measurement location on the user's hand. The combination of an imaging unit and a measuring unit may enable improved inspection, namely providing measurement data in addition to enabling a visual inspection. Furthermore, the use of the imaging unit may assist in guiding the user to insert their hand to a required location and may assist in ensuring that the measuring unit obtains a measurement at a desired measurement location.

The measurement unit may have one or more of a plurality of sensors. As discussed below, the sensors may be configured to provide data relating to a physical property measured or detected at a measurement location on a user's hand. The measurement location may be at a tip of a digit, namely a finger or thumb, of a user's hand, at another location on a digit of the user's hand such as on the phalanges, on the palm of the user's hand, for example in the middle of the palm or on an edge of the palm at which the fingers join the palm of the user's hand, or on the back of the user's hand. Some sensors may be configured to provide measurements between two such measurement locations. It should also be appreciated that, where a measuring unit has a plurality of sensors, each sensor may measure or detect a physical property at different measurement locations. Alternatively, in some arrangements, two or more sensors may measure or detect respective physical properties at the same measurement location.

In an arrangement, the measuring unit may include a sensor configured to measure a temperature at a measurement location on a user's hand. For example, a thermometer, such as an electric thermometer may be provided. Accordingly, a user may touch the part of the inspection system containing the sensor, to an item, such as a component within the apparatus being inspected, in order to measure the temperature of that component. Alternatively or additionally, the thermometer may be used to provide a warning to a user if the environmental temperature risks injury to the user.

In an arrangement, the measuring unit may include a sensor configured to measure a force exerted on a measurement location on a user's hand. Such a sensor may be used to enable an operator to determine whether flexible components in an apparatus have the correct stiffness or whether they are loose or damaged. Examples of such a force sensor may include resistive touch pads that change electrical resistance when pressed, capacitive touch pads that change charge capacity when pressed and/or flexible structures with embedded strain sensors. Force sensors may also be used to store touch data to be played back using haptic devices for technician and engineer training.

In an arrangement, the measuring unit may comprise a sensor configured to measure the acceleration and/or position of a measurement location on a user's hand. This may include the use of accelerometers, for example that may be used in an inertial measurement unit, namely an arrangement tracking the movement of the measurement location relative to a starting location. If the starting location is known, subsequent locations may therefore be determined. This may enable tracking position of the inspection system relative to the user and/or within an apparatus being inspected.

Sensors configured to measure acceleration and/or position of a measurement location may also be configured to provide measurements relative to a fixed point within the inspection system and/or relative to another measurement location. Such sensors may include flex sensors, configured to change electrical properties when flexed, strain sensors, configured to change electrical properties when stretched, optical fibre sensors, such as a fibre Bragg grating sensors providing measurements of strain and position, rotary encoders that may be positioned at a joint of the user's hand to measure movement of digits relative to the hand, and string or linear encoders positioned at the end of tendons connected to fingers or joints.

In an arrangement, the use of sensors such as those discussed above may be configured in order to provide a measurement of the separation between two measurement locations on a user's hand. For example, such a sensor may be configured to measure the separation between the tips of two digits, such as between the tip of a finger and the tip of a thumb of the user. Accordingly, the user may position their hand within an apparatus and measure the separation between two parts. For example, if the sensor is configured to measure the separation between the tips of the thumb and forefinger, a user may hold a component between the thumb and forefinger and obtain a measurement of the size of the component.

In an arrangement, the measuring unit may comprise a sensor configured to measure ionising radiation at a measurement location on the user's hand. For example, the sensor may be a Geiger counter. Provision of such a sensor may improve the safety of an operator required to inspect an apparatus in which there is a risk of elevated levels of radiation. Alternatively or additionally, a deviation from an expected level of radiation may indicate a fault within a system, even if it poses no safety threat to the operator.

In an arrangement, the measuring unit may comprise a sensor configured to measure at least one of the direction and the strength of a magnetic field at a measurement location on the user's hand. For example, a magnetometer may be provided that may facilitate the inspection of electrical components and/or residual magnetism in components. In an arrangement, the measuring unit may include a sensor configured to measure at least one of the direction and strength of an electric field at a measurement location on the user's hand. In an arrangement, a sensor may in particular be configured to detect eddy currents in a material in proximity to measurement location on a user's hand.

In an arrangement, the measuring unit may include a sensor configured to detect soundwaves at a measurement location on a user's hand. This may include a microphone, that may detect audible sounds, such as creaking or scraping sounds that may be indicative of the condition of the apparatus and/or indicative of faults within an apparatus. Alternatively or additionally, the sensor may be configured to detect ultrasonic soundwaves, for example for ultrasonic non-destructive testing that may be used to detect internal flaws in components, such as cracking or delamination.

In an arrangement, the measuring unit may include a sensor configured to measure at least one of voltage, electric current, and the electrical resistance between two measurement locations on a user's hand. For example, such a sensor may be configured to provide a measurement between the tips of two digits on the user's hand, for example between the tips of the thumb and forefinger. Accordingly, in use, a user may simply touch the tips of the two digits to two different parts of the apparatus being inspected in order to obtain a desired measurement of the electrical voltage, electric current and/or electrical resistance between the two parts. This may be significantly easier than manipulating two probes into an apparatus and holding each against a different part of the apparatus.

The imaging unit comprises two or more imaging sub-units that may be the same or different. Each sub-unit is configured to provide images from a point of view, for example two or three sub-units may be located on two or three different digits of the user's hand. For example, the point of view may be on the thumb or finger, specifically on the phalanges or tip of a digit, on the palm of the user's hand, for example in the middle of the palm or on an edge such as the edge at which the fingers join the palm, or on the back of the user's hand.

With the imaging unit having multiple sub-units providing images, each sub-unit can provide images having differing locations of point of view. In some embodiments two or more of the sub-units may provide images having a common point of view. In any event, the sub-units of the imaging unit may all be of different types, as discussed below, or at least two, may be the same, for example providing images from different points of view.

One or more of the sub-units providing images may be a camera that may enable intuitive manual inspection of the apparatus and/or may assist in guiding the user's hand into the apparatus. It should be appreciated that a camera may be configured to provide a colour image or a monochrome image. Where plural cameras are provided, the images provided by each may be provided separately to a user as discussed further below and/or the images may be joined, using software within a controller as discussed below, in order to increase the field of view. The use of plural images from different points of view may also be used to compute the distances by using stereovision.

In an arrangement, a sub-unit of the imaging unit may comprise a 360° camera, such as a dual-lens 360° camera. Such a camera may be placed, for example, on the tip of a finger such as the index finger to provide a full immersive view of the environment around the inspection system.

In an arrangement, a sub-unit of the imaging unit may include a wavelength filtered camera, configured to capture specific wavelengths of visible, infrared or ultraviolet light. Such a sub-unit may be used for inspection of particular phenomena such as florescence or radiative luminescence.

In an arrangement, a sub-unit of the imaging unit may comprise a thermal camera, configured to detect heat emissions from objects within the field of view. Such a sub-unit may be useful for warning a user if components are hot. It may also be useful for identifying components that have been subject to unintended wear, which may result in frictional heating.

In an arrangement, a sub-unit of the imaging unit may include a zoom camera, namely a camera with high or variable magnification. This may assist in inspection of components that the inspection system cannot closely approach.

In an arrangement, a sub-unit of the imaging unit may include a macrocamera, configured to provide high quality images of components that are close to the inspection system, enabling close up inspection of a component.

In an arrangement, a sub-unit of the imaging unit may include a stereocamera, in which two cameras are provided that are set apart but rigidly connected at a known separation. Such a camera may provide 3D images to a user via a suitably configured display apparatus.

Alternatively or additionally, a stereocamera may be used to measure the distance to objects within the field of view. By measuring the distance to two different objects, it may be possible to determine the separation between the two objects.

In an arrangement, a sub-unit of the imaging unit may include a camera with an image splitting optical element capable of splitting components of light (such as wavelength or polarisation) in two or more directions, such as by using a dichroic filter beam splitter or a polarising filter beam splitter. A camera fitted with a dichroic, polarising or other beam splitter may for example be used to simultaneously view features in front of and behind the hand. A dichroic filter is a mirror that allows some wavelengths of light to go through the glass and some to be reflected. Hence, with a dichroic filter placed in front of the camera sensor and at 45 degrees inclination, the camera can see through the mirror in the wavelengths that can pass and can see the sideways reflection on the wavelengths that cannot pass. The same is true for selective polarisation splitters. Cubic prism wavelength splitters can be used to separate red green and blue light arriving at a sensor, from the left, forward and right directions (for example), which could be used to give a user views in directions towards which fingers cannot naturally bend.

In an arrangement, a sub-unit of the imaging unit may comprise an ultrasound receiver. This may, for example, enable the generation of images showing the results of ultrasound testing, such as non-destructive testing of welds and/or other parts of a component that may be subject to cracking or delamination.

As noted above, the imaging unit 70 may comprise two sub-units configured to provide images from different points of view, and the inspection system may comprise a measuring unit 60. The measuring unit 60 may comprise a separation sensor 44, 45, 46. The separation sensor 44, 45, 46 may be configured to measure the separation between the two sub-units. A measurement of the separation (i.e. distance) between the two sub-units may provide useful information for processing images captured by the two sub-units. For example, if the images of the two sub-units are to be combined to form an image with a wider field of view, then the separation measurement may be used to account for parallax of the objects captured in the images. Alternatively, if the images captured by the two sub-units are to be used for producing a stereographic image, then the separation measurement may be used to calculate the stereographic baseline (i.e. the optical distance between the points of view at which the component images of the stereographic image are taken). More particularly, the stereographic baseline may equal the separation distance measured by the measuring unit 60.

The inspection system may be configured such that the optical axes of the sub-units are substantially parallel. In other words, the sub-units may be pointed at substantially the same direction. This may be useful for producing a stereographic image. Specifically, by pointing the sub-units in the same direction, the area of the environment covered by one sub-unit may substantially overlap with that captured by the other sub-unit. This may provide a broad field of view of the stereographic image because stereographic information may be derived from the overlapping area.

Furthermore, the sub-unit of the imaging unit may be arranged side by side. In other words, the separation between the two sub-units may be substantially perpendicular to the optical axis of the sub-units. With this arrangement, the object or feature may appear in substantially the same size in the images captured by the sub-units. Stereographic information may thus be more accurately derivable from the captured images as object scale correction may be dispensed with.

As noted above, instead of producing a stereographic image, the images captured by the sub-units of the imaging unit may be combined together to form an image with a wide field of view. In this case, the optical axes of the sub-units may be non-parallel to each other so as to further increase the field of view of the resulting combined image.

Figure 4:
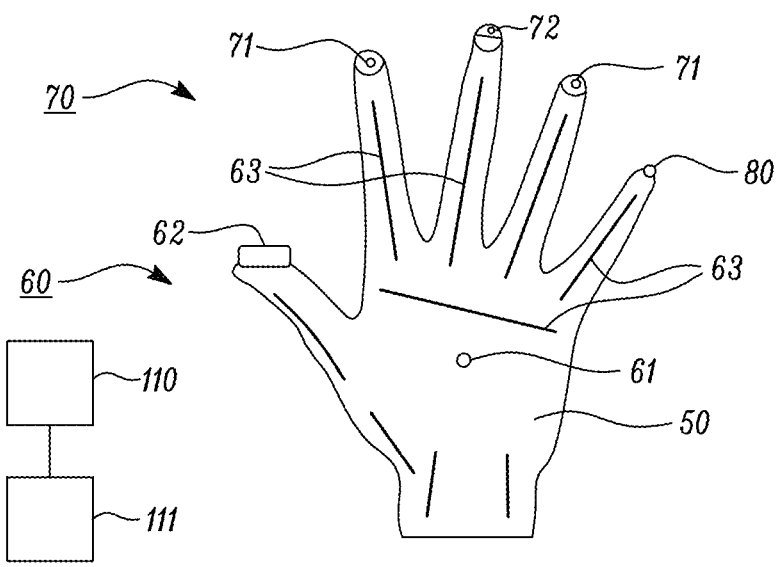
FIGS. 4 to 6 depict examples of inspection systems according to the present disclosure.

FIG. 4 depicts an example of an inspection system. In this arrangement, a glove shaped covering 50 is provided to encapsulate a user's hand. The measuring unit 60 includes a sensor in the form of a thermometer 61 mounted to the back of the hand and a sensor in the form of an ultrasonic probe 62 mounted to the tip of the thumb. Measuring unit 60 also includes a plurality of position sensors 63, mounted to the phalanges of each of the digits and to plural locations on the back of the hand, providing information on the position of each part of the hand.

The imaging unit 70 of the inspection system shown in FIG. 4 includes a 360° camera 71, mounted to each of the tip of the index finger and the tip of the ring finger. This may be used to identify the locations of welds to be inspected. The imaging unit includes a separation sensor but this is not shown in this Figure. A couplant, or oil, dispenser 80 is provided on the tip of the little finger, enabling the user to place a layer of fluid on a weld to be inspected using the ultrasonic probe 62. A macro camera 72 is provided on the tip of the middle finger, enabling a user to take pictures of any areas that are deemed interesting, for example based on inspection using the ultrasonic probe.

Finally, the inspection system shown further includes a controller 110, wirelessly connected to the measuring unit and the imaging unit, and a user interface 111, configured to output information derived from the measuring unit and the imaging unit.

Figure 5:
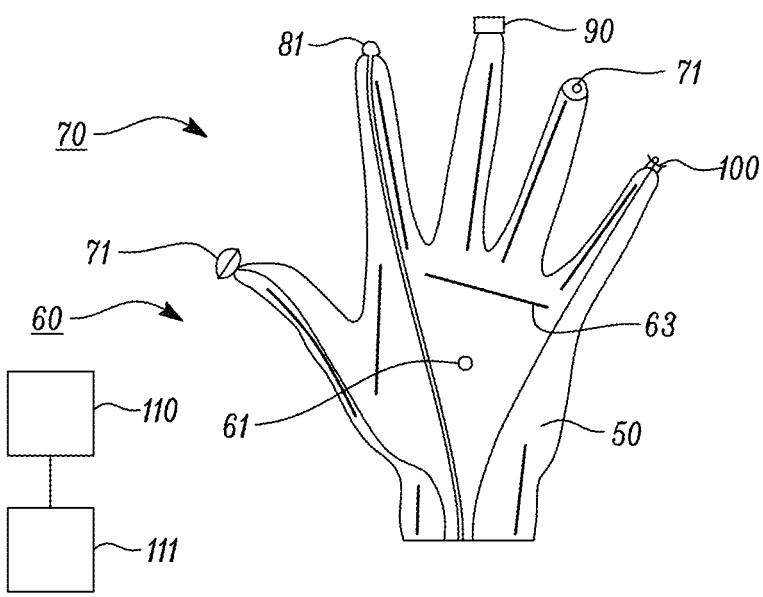

FIG. 5 depicts a further example of an inspection system. As before, a glove-shaped covering 50 is provided that encapsulates at least the user's hand. The measuring unit 60 includes a thermometer 61 and a plurality of position sensors 63 similar to those discussed above in relation to FIG. 4. The imaging unit 70 includes a wide angled camera 71 mounted on the tip of the thumb and a wide angled camera 71 mounted on the tip of the ring finger. This may be used in conjunction with a fluid dispensing unit in the form of a fluorescent penetrant dispenser 81 provided on the tip of the index finger, a fluid absorbing unit in the form of a wiping sponge 90 provided on the tip of the middle finger, and an illuminator in the form of an ultraviolet light illuminator 100 provided on the tip of the little finger in order to apply the penetrant to an area of interest, clean the area of interest and then inspect for residual penetrant in any cracks. The imaging unit includes a separation sensor but this is not shown in this Figure.

Figure 6:
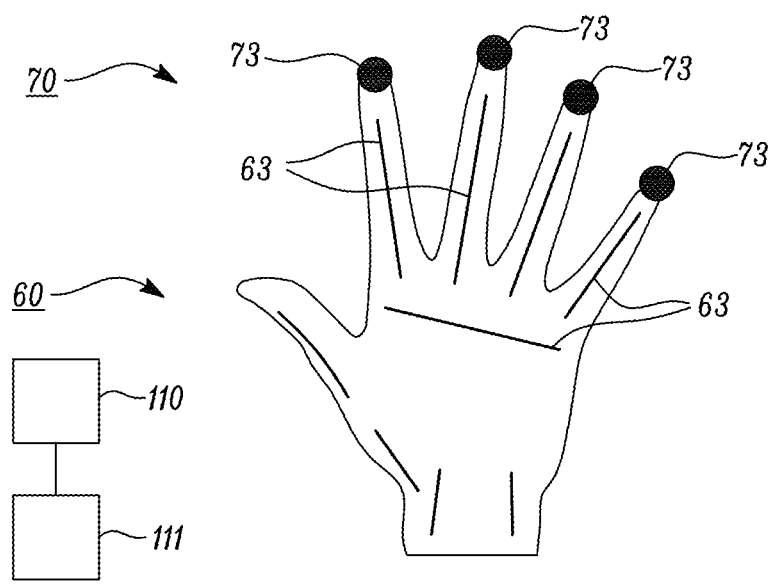

FIG. 6 depicts a further example of an arrangement of an inspection system. In this arrangement, the imaging unit 70 includes a camera 73 mounted to the tip of each of the fingers and the measuring unit 60 includes plural position sensors 63 configured to measure the position of each of the fingers, at least relative to each other. In such an arrangement, the controller 110 may be configured to combine together the images from the plural cameras 73 and generate a single large field of view image to be displayed on the user interface 111. The imaging unit includes a separation sensor but this is not shown in this Figure.

Figure 7A:
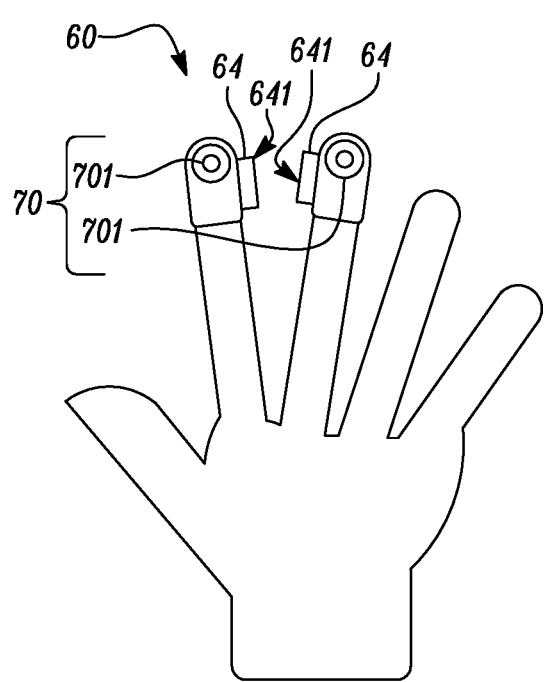
FIGS. 7(A)-7(C) depict an inspection system with an imaging unit comprising multiple sub-units, and a separation sensor comprising contact pads.

Various implementations of the measuring unit 60 are possible. For example, as shown in FIG. 7(A), the separation sensor 64 may comprise two contact pads. Each of the contact pads may have a predetermined thickness. Each contact pad may have a contact surface 641. Each contact pad may be fixedly attached to the inspection system such that it is in a substantially fixed positional relationship with a respective sub-unit 701 of the imaging unit 70. Thus, each contact surface 641 may also be substantially fixedly positioned relative to a respective sub-unit 701 of the imaging unit 70.

In other words, the displacement (i.e. the distance and direction of the distance) between the contact surface 641 and the respective sub-unit 701 may be known. This displacement may be a function of the predetermined thickness of the contact pad and the positioning of the contact pad relative to the respective sub-unit 701 of the imaging unit 70. The contact pad may be positioned on the inspection system so that it is in alignment with the respective sub-unit 701. The contact pads and the sub-units 701 may all be mounted on the inspection system such that they are aligned substantially on a straight line. Alternatively, the contact pad may be offset from the sub-unit 701. As shown in FIG. 7(A), the centres of the contact pads may be slightly offset from an imaginary line joining two sub-units 701 of the imagining unit 70.

Figure 7B:
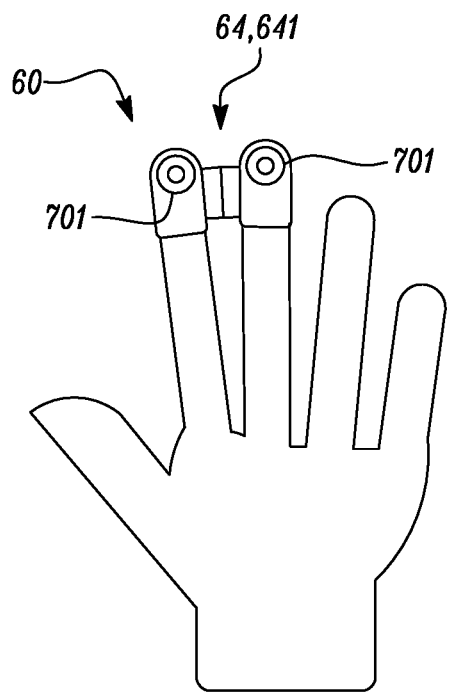

The two contact surfaces 641 may be brought into contact with each other. For example, as shown in FIG. 7(A) and FIG. 7(B), the inspection system may be worn on the user's hand, and the two contact surfaces 641 may be brought into contact by bringing together two fingers. When the two contact surfaces 641 are brought into contact, the separation distance between the two sub-units 701 of the imaging unit 70 may be determined. Specifically, the separation between the sub-units 701 may be equal to the sum of the known displacements between the contact surfaces 641 and the respective sub-units 701 of the imaging unit 70. Therefore, by providing the contact pads as described above, it may be possible to repeatably and reliably position the sub-units 701 at a known or predetermined distance apart. Furthermore, the contact pads may be pressed together so as to stabilise the separation between the sub-units 701 of the imaging unit 70. It may be useful to have a known and stable separation between the sub-units 701 because the separation measurement may be used when combining the images captured by the sub-unit 701 in order to form a wider image, or when establishing the baseline of a stereographic image.

It should be appreciated that, even though a separation sensor may be "substantially fixedly positioned" relative to a respective sub-unit 701, depending on the construction of the inspection system, the relative position between, for example, the contact pad of the separation sensor and the sub-unit 701 may in practice be slightly variable due to material flection. In particular, if the sub-unit 701 and the respective contact pad are provided on a finger of a glove, the relative position of the contact pad may vary somewhat due to the flexibility of the glove material. It should be understood, however, that a degree of flexibility is tolerable as long as the separation between the two sub-units 701 may be determined to a sufficient level of accuracy. It should be appreciated that there may be a trade-off between the accuracy of the separation and user comfort due to the flexibility of the material on which the sub-unit 701 and the respective contact pad are provided.

The contact pads (and thus the contact surfaces 641) may be urged towards each other by magnetic attraction. The magnetic attraction may be provided by any known means. For example, one contact pad may comprise a permanently magnetic material, or may comprise an electromagnet. The other contact pad may comprise a non-magnetised material which is attracted to the other, magnetic contact pad. Alternatively, both contact pads may be magnetic and may be configured to be attracted to each other. This arrangement may prevent unintentional relative movements between the sub-units 701, and may thus enhance the stability of the separation between the sub-unit 701 of the imaging unit 70.

The separation sensor 64 may be configured to sense whether the two contact surfaces 641 are in contact. For example, the separation sensor 64 may comprise electrical contacts (not shown in FIGS. 7(A)-7(C)) provided on the respective contact surfaces 641 so that an electric circuit is completed when the contact surfaces 641 are brought into contact with each other. Alternatively, one or more of the contact surfaces 641 may be made of an electrically conductive material so that the entire contact pad functions as an electrical contact. Other mechanisms may be used. For example, a Hall effect sensor, a capacitive sensor or an inductive sensor may be provided within one or more of the contact pads so as to sense whether the two contact surfaces 641 are in contact.

The output of the separation sensor 64 may be used to determine how the captured images are to be processed. For example, when the separation sensor 64 senses that the two contact surfaces 641 are in contact, the inspection system may be configured to output a stereographic image based on the images provided by the imaging unit 70. For example, when the separation sensor 64 senses that the two contact surfaces 641 are not in contact, the inspection system may be configured to combine an image provided by one sub-unit 701 of the imaging unit 70 with an image provided by the other sub-unit 701 of the imaging unit 70 to produce a combined image with an enlarged field of view.

Therefore, the user of the inspection system may be able to choose between a stereographic image or a combined wide-view image by bringing together or separating the two contact surfaces 641. It should be appreciated that the output of the separation sensor 64 may be used, alternatively or additionally, to control functions of the inspection system other than controlling the processing of images captured by the imaging unit 70.

Figure 8A:
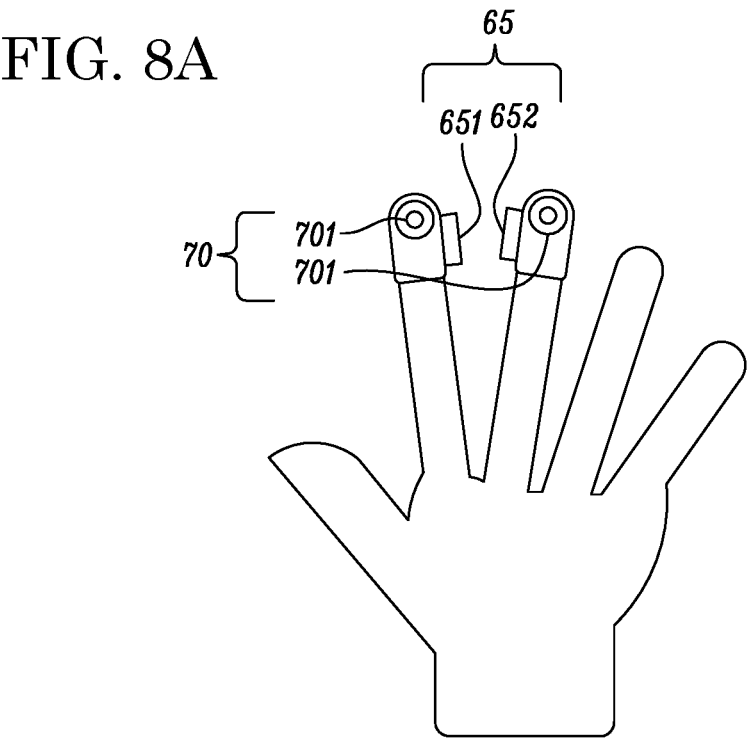
FIGS. 8(A)-8(B) depict an inspection system with an imaging unit comprising multiple sub-units, and a separation sensor comprising a camera and a fiducial marker.

Instead of or in addition to contact pads, as shown in FIG. 8(A), the separation sensor 65 may comprise a camera 651 and a fiducial marker 652. The term "fiducial marker" is used to refer to an object with visible markings provided thereon to serve as a dimensional reference. The camera 651 of the separation sensor 65 may be substantially fixedly positioned relative to one of the sub-units 701 of the imaging unit 70. Correspondingly, the fiducial marker 652 may also be substantially fixedly positioned relative to the other of the sub-units 701 of the imaging unit 70.

As mentioned above, the relative positioning of the separation sensor 65 and the respective sub-unit 701 of the imaging unit 70 may not be perfectly rigid in practice. A degree of flexibility may be tolerable depending on the required accuracy of the measurement of the separation between the two sub-units 701 of the imaging unit 70.

Figure 7C:
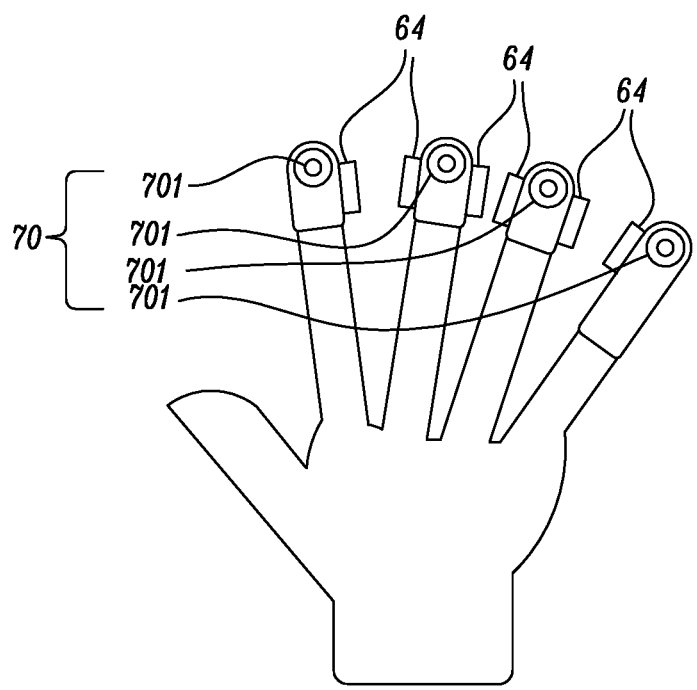

Similar to the FIGS. 7(A)-7(C) arrangement with contact pads, the displacement between the camera 651 of the separation sensor 65 and the respective sub-unit 701 may be known or predetermined. The displacement between the fiducial marker 651 and the respective sub-unit 701 may also be known or predetermined.

The fiducial marker 652 and the camera 651 of the separation sensor 65 may be positioned in the inspection system such that the fiducial marker 652 may enter into the field of view of the camera 651 of the separation sensor 65. When the fiducial marker 652 enters into the field of view of the camera 651 of the separation sensor 65, the markings of the fiducial marker 652 may be captured in the image provided by the camera 651.

The camera 651 may have a known field of view, and the fiducial marker 652 may contain markings representing a known dimension. Therefore, based on the image of the fiducial marker 652 as captured by camera 651, the angular size of markings provided on the fiducial marker 652 as they appear in the captured image may be determined, and the distance between the camera 651 and fiducial marker 652 may be computed based on the angular size. Because the camera 651 and the fiducial marker 652 are each separated by a known displacement from the respective sub-units 701 of the imaging unit 70, it may be possible to compute the separation between the two sub-units 701 based on the image of the fiducial marker 652 captured by the camera 651. The separation sensor 65 may be configured to execute this computation.

Figure 9A:
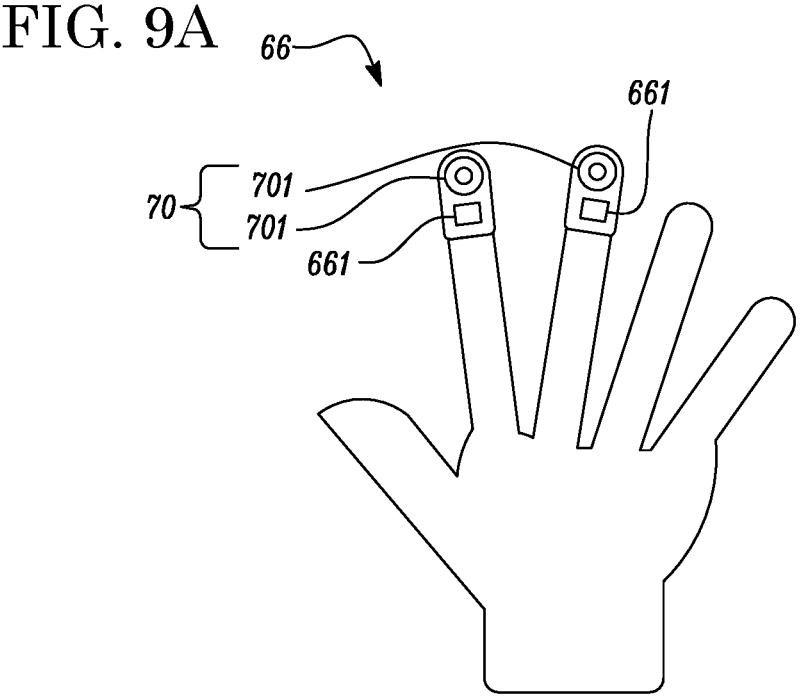
FIGS. 9(A)-9(B) depict an inspection system with an imaging unit comprising multiple sub-units, and a separation sensor comprising inertial measurement units.

As yet another alternative, as shown in FIG. 9(A), the separation sensor 66 may alternatively or additionally comprise two inertial measurements units 661. Each of the two inertial measurement units 661 may be substantially fixedly positioned relative to a respective sub-unit 701 of the imaging unit 70. As explained above, the relative positioning of the inertial measurement units and of the respective sub-units 701 of the imaging unit 70 may in practice not be perfectly rigid and may be slightly variable due to material flection.

The displacement between each inertial measurement unit 661 and the respective sub-unit 701 of the imaging unit 70 may also be known. The separation sensor 66 may be configured to compute the separation between the two sub-units 701 of the imaging unit 70 based on the output of the two inertial measurement units 661.

Inertial measurement units may be capable of measuring linear and angular acceleration in three dimensions. Acceleration measurements may be converted into displacement by integrating twice with respect to time. The separation sensor 66 may require zeroing before the separation between the sub-units 701 may be computed based on the output of the two inertial measurement units 661. Specifically, the user may manipulate the inspection system such that the two sub-units 701 are separated by a known distance, and may indicate to the system that this is the zeroing position and velocity.

As noted above, the separation sensors 65 and 66 may compute the separation between the two sub-units 701 of the imaging unit 70. The inspection system may make use of this computed separation. For example, the inspection system may be configured to output a stereographic image based on the images provided by the imaging unit 70 when the computed separation between the two sub-units 701 of the imaging unit 70 is less than a predetermined threshold. Alternatively or additionally, the inspection system may be configured to combine an image provided by one sub-unit 701 of the imaging unit 70 with that provided by the other sub-unit 701 of the imaging unit 70 to produce a combined image with an enlarged field of view.

Therefore, the user of the inspection system may be able to control whether a stereographic image or a combined image should be output by the inspection system. The user may achieve this control by manipulating the inspection system so as to change the separation distance between the two sub-units 701 of the imaging unit 70.

As noted above, the imaging unit 70 may comprise two sub-units 701 configured to provide images from different points of view, and the measuring unit 60 may comprise a separation sensor 64, 65 and 66 configured to measure the separation between the two sub-units 701. However, the imaging unit 70 may comprise more than two sub-units. The more than two sub-units 701 may be configured to provide images from different points of view.

For example, the imaging unit 70 may comprise three sub-units 701 configured to provide images from three different points of view. Correspondingly, the separation sensor 64, 65, 66 may be configured to measure more than one separation amongst the sub-units 701 of the imaging unit 70. Specifically, in the example where the imaging unit 70 comprises three sub-units 701, the separation sensor 64, 65 and 66 may be configured to measure the separation between the first and second sub-units 701 and the separation between the second and third sub-units 701.

Figure 8B:
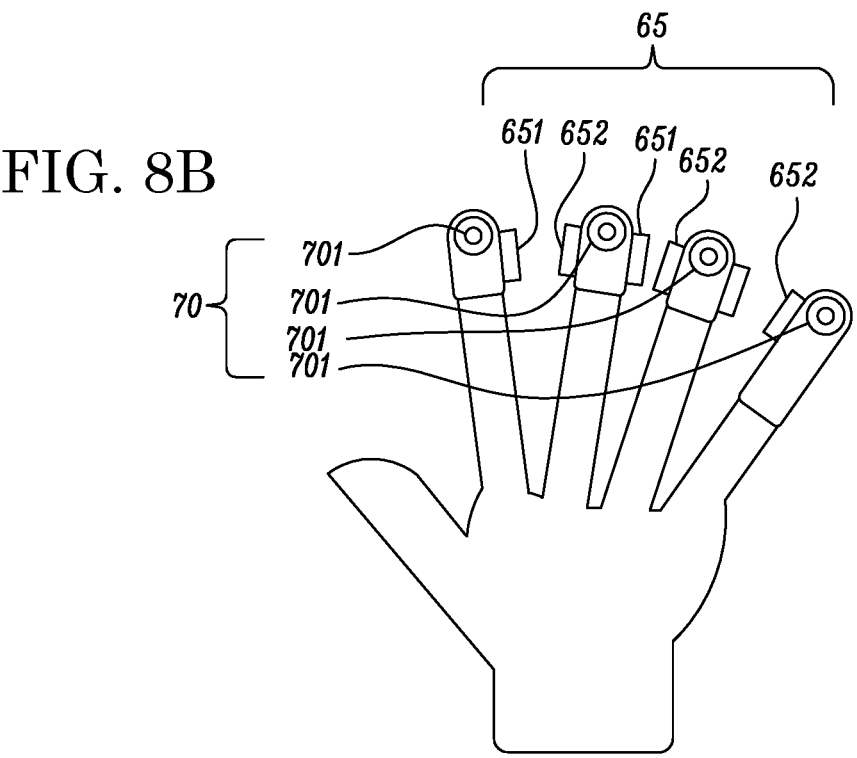
Figure 9B:
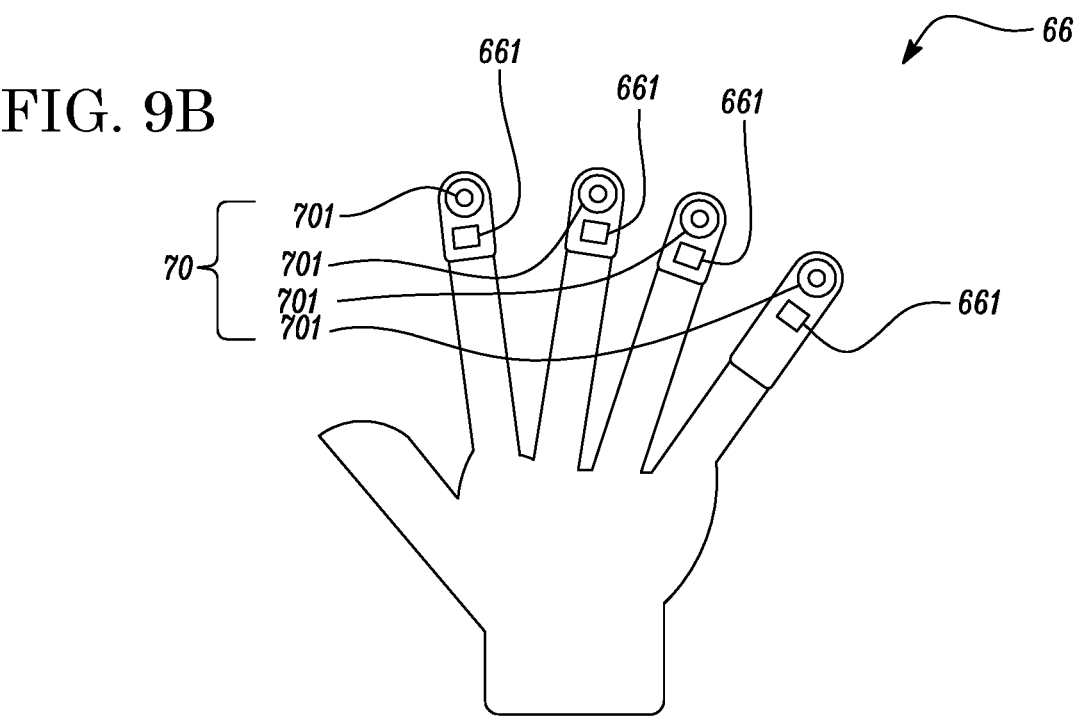
Figure 10:
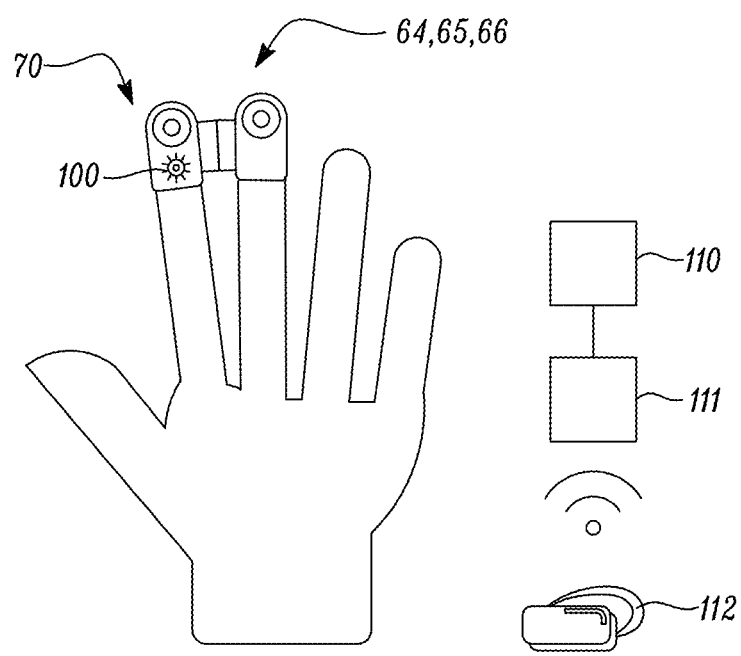
FIG. 10 depicts an inspection system and a display connected thereto.

As shown in FIG. 7(C), FIG. 8(B) and FIG. 9(B), the more than two sub-units 701 may be arranged substantially in a row. Therefore, the separation sensor 64, 65, 66 described above for two sub-units 701 of the imaging unit 70 may be duplicated so as measure two separations.

In more specific terms, where there are three sub-units 701, the separation sensor 64 may comprise one contact pad substantially fixedly positioned relative to a first sub-unit 701, two contact pads substantially fixedly positioned relative to a second sub-unit 701, and one contact pad substantially fixedly positioned relative to a third sub-unit 701. The contact pads may be orientated such that the contact surface 641 of the first sub-unit 701 is configured to contact the contact surface 641 of one of the contact pads of the second sub-unit 701, and the contact surface 641 of the other of the two contact pads of the second sub-unit 701 may be configured to contact the contact surface 641 of the contact pad of the third sub-unit 701.

Similarly, as shown in FIG. 8(B), the separation sensor 65 may comprise two cameras 651 and two fiducial markers 652 so as to measure two separations amongst three sub-units 701 of the imaging unit 70. In specific terms, a camera 651 may be substantially fixedly positioned relative to each of the first and second sub-units 701, and a fiducial marker 652 may be substantially fixedly positioned relative to each of the second and third sub-units 701. The cameras 651 and the fiducial markers 652 may be orientated such that the camera 651 of the first sub-unit 701 and the fiducial marker 652 of the second sub-unit 701 are configured to face each other, and such that the camera 651 of the second sub-unit 701 and the fiducial marker 652 of the third sub-unit 701 are configured to face each other. Wth this arrangement, the separation between the first and second sub-units 701 and the separation between the second and third sub-units 701 may be individually measured.

Similarly, as shown in FIG. 9(B), the separation sensor 66 may comprise more than two inertial measurement units 661. An inertial measurement unit 661 may be substantially fixedly positioned relative to each of the first, second and third sub-units of the imaging unit 70. In this arrangement, the position of each sub-unit 701 relative to a zeroing position may be individually obtained, and the separation between any two of the sub-units 701 may be computed.

The above arrangements may be further adapted to provide more than three sub-units 701 following the same principles.

In arrangements where the sub-units 701 of the imaging unit 70 are to be mounted on the fingers of the user, the inspection system may be configured to compensate for the different lengths of the user's fingers. For example, as illustrated in FIG. 7(C), FIG. 8(B) and FIG. 9(B), because the little finger is typically shorter than the other fingers, the inspection system may comprise additional material to extend the length of the little finger so that a sub-unit 701 of the imaging unit 70 provided thereon may be substantially in a row with the sub-units 701 provided on the other fingers. By ensuring that the sub-units 701 of the imaging unit 70 are substantially in a row, the user may be able to more intuitively control the visible range of each sub-unit 701. Furthermore, this may ensure that there is a good degree of overlap between the images captured by the more than three sub-units 701, which may in turn allow a stereographic image produced by the imaging unit 70 to have a wide field of view.

As noted above, the imaging unit 70 may comprise two or more sub-units 701. Based on the images provided by the two or more sub-units 701 of the imaging unit 70, the inspection system may be configured to compute a dimension of an object or between objects captured in the images. Specifically, because images are captured at least two points of view by the two or more sub-units 701, depth information may be derived from the captured images.

Furthermore, by providing a measuring unit 60 comprising a separation sensor 64, 65, 66, the separation between two sub-units 701 may be measured. The measured separation, as explained above, may be used to the stereographic baseline of a stereographic image captured by the sub-units 701. Based on the baseline, depth information may be accurately derived from the captured images. Specifically, depth information may be derived using the position of an object as it appears in the captured images, the known field of view of the sub-units 701, and the computed baseline.

Figure 11:
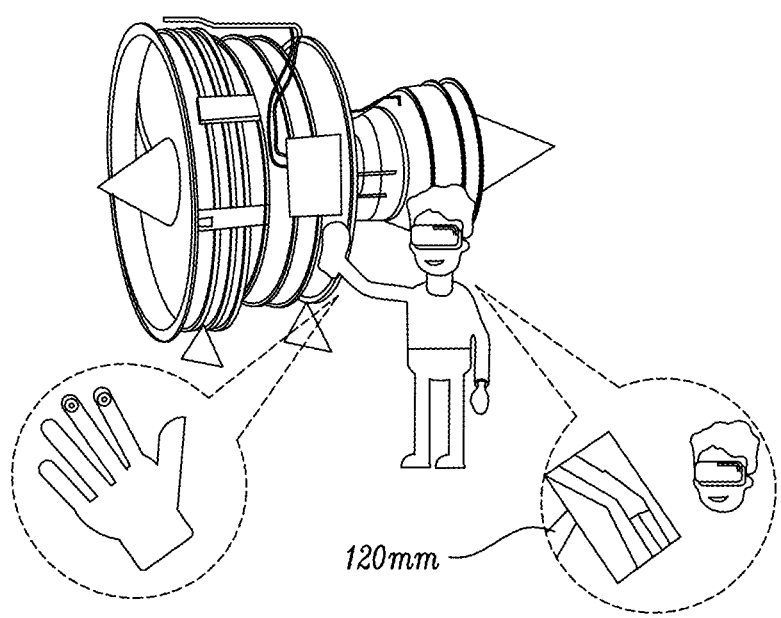
FIG. 11 depicts an inspection system in use.

The inspection system may be configured to recognise objects in the captured images using any known image processing techniques. For example, the inspection system may be configured to apply edge detection to the captured images. Alternatively or additionally, the user may manually specify points on an object or objects captured in the images. Because depth information is contained in the captured images, it may be possible to obtain the three-dimensional coordinates of a point specified on the stereographic image. Consequently, by specifying two points on the stereographic image, the three-dimensional coordinates of each of the two specified points may be calculated, and the distance between the two specified points may also be computed. As shown in FIG. 11, for example, the distance between two rivets in a gas turbine engine may be computed this way.

Alternatively or additionally, the inspection system may compute a three-dimensional map of the space captured in the images. This may be achieved by calculating the three-dimensional coordinates of a large number of points in the captured images. The points may be points arranged in a grid. Alternatively, the points may be randomly distributed. The number of points may be selected based on the requisite degree of detail of the three-dimensional map.

Alternatively or additionally, the inspection system may be configured to recognise objects, such as by using edge recognition. In this case, the inspection system may be configured to obtain three-dimensional coordinates of vertices of objects captured in the images, as well as coordinates of points along edges of objects in the captured images. Such an approach may result in a more accurate three-dimensional map of the space captured using potentially a smaller number of points.

In an arrangement, the inspection system may include a covering that encapsulates at least the user's hand. For example, the inspection system may include a glove, to which the other components of the inspection system may be mounted. Such a covering may provide protection for the user's hand. For example, the covering may be formed from a material that is at least one of fluid impermeable, gas impermeable, thermally resistant, electrically resistant and puncture resistant.

In this context, it should be understood that a thermally resistant material may be a material that reduces thermal transfer to the user's hand to a level that should avoid injury when the inspection system is exposed to temperatures that may be expected within an apparatus to be inspected by the inspection system, including temperatures that may be anticipated in the event of a malfunction of the apparatus. Similarly, an electrically resistant material may be one that is expected to prevent a user from receiving an electric shock under conditions expected in the apparatus to be inspected by the inspection system.

A puncture resistant material may be one that is expected to resist penetration by a sharp object under forces that may be exerted on the inspection system during use within an apparatus to be inspected.

In an arrangement, the covering may be configured to be tight-fitting. This may enable the user to insert their hand and the inspection system into small spaces. Furthermore, having the covering fit tightly and/or selecting a material that is smooth or at least tightly woven, may prevent loose material from catching on sharp edges, which may potentially trap the user's hand within the apparatus.

In an arrangement, the covering may be extended to encapsulate at least a part of the forearm of the user. It may extend up to or above the elbow of the user and may cover some or all of the upper arm of the user. Such an arrangement of a covering may provide protection for the user's arm as well as their hand when inserting the inspection system deep into an apparatus.

In an arrangement, the inspection system may include a fluid dispensing unit configured to supply at least one fluid from at least one dispensing location located on the user's hand. The dispensing locations from which the dispensing unit may be configured to supply fluid may include one or more of the digits of the user's hand, on the tip of a digit of the user's hand, on the phalanges of a digit of a user's hand, on the palm of the user's hand or on the back of the user's hand. Where the fluid dispensing unit is configured to supply fluid from more than one dispensing location, it should be appreciated that the same fluid may be supplied from more than one dispensing location and/or different fluids may be supplied from different dispensing locations.

The fluid dispensing unit may be configured to supply oil, for example to function as a couplant, namely a layer of fluid to couple a component to be inspected to an ultrasonic probe, or lubricate a part of an apparatus. Alternatively or additionally, the fluid dispensing unit may be configured to supply a liquid penetrant. For example, a fluorescent liquid may be supplied for crack detection, weld inspection or similar purposes. Alternatively or additionally, the fluid dispensing unit may be configured to supply an air jet and/or a water jet that may be used to clean a component and/or remove debris.

In an arrangement, an inspection system may include a fluid absorbing unit that is arranged to absorb fluid at at least one location on a user's hand, for example on a digit of the user's hand, specifically at a tip of a digit of the user's hand and/or on the phalanges of a digit of the user's hand, on the palm of the user's hand and/or on the back of the user's hand. The fluid absorbing unit may be formed simply by a sponge that absorbs fluid. Alternatively or additionally, a suction system may be provided that removes the fluid.

In an arrangement, the inspection system may include at least one illuminator. Such an illuminator may emit one or more of visible light, infrared radiation and ultraviolet radiation. In general, the illuminator may be used to illuminate components within the apparatus being inspected by the inspection system. For example, an ultraviolet radiation illuminator may be used to illuminate components to which a fluorescent penetrant has been applied in order to investigate the existence of cracks and/or weld defects.

It will be appreciated that one or more illuminators may be provided at any of a plurality of locations on the user's hand, for example on a digit of the user's hand, optionally at the tip of a digit or on the phalanges of a digit of a user's hand, on the palm of the user's hand or on the back of the user's hand.

The inspection system may also include a controller. The controller may receive data from the imaging unit and/or the measuring unit and output corresponding information to a user interface, such as a display 112. It should be appreciated that the connection between the imaging unit and/or the measuring unit and the controller may be by any suitable means, including cables, optical fibres or a wireless connection such as Bluetooth or wi-fi. The controller may be configured also to be worn by the operator, for example as a back-pack, waist bag or satchel, depending on the size of the controller. Likewise a power supply for the inspection system may similarly also be worn by the user. This may enable the overall system to be mobile. Alternatively or additionally, the controller and/or power supply may be provided separately.

The user interface may include at least one display 112 configured such that it can display an image based on data from the imaging unit. For a system in which the imaging unit comprises a plurality of sub-units, each configured to generate respective images, plural displays may be provided such that a user may view plural images at the same time and/or the user interface may be configured such that a user can switch between plural image sources on a single display.

The user interface may include at least one head-mounted display 112 such as a virtual reality headset. For a system in which the imaging unit comprises a camera or a plurality of cameras that return three-dimensional data, the head-mounted display 112 may be used to give the user the appearance of being immersed in the environment. Alternatively or additionally, for a system in which the imaging unit comprises two cameras a fixed distance apart, such as a stereocamera, a head-mounted display 112 may be used to display the image of a first camera to a first eye and the image of a second camera to a second eye, giving the user natural-feeling depth perception within the environment.

In an arrangement, the controller and/or the user interface may be configured such that images displayed with overlaid additional images and/or information to provide an augmented reality display. The use of augmented reality may, for example, enable the display of measurement values, interesting features, highlight likely locations of damage or display names of components.

For example, the imaging unit 70 comprises two or more sub-units 701 as described above, and a separation sensor 64, 65 and 66 also as described above, and the inspection system may be capable of measuring dimensions of an object or between objects in the captured images. The measured dimensions may be displayed in the display 112, such as by overlaying dimension markings over the captured images. As noted above, the display 112 may be an augmented reality display. As illustrated in FIG. 11, the user may see in the augmented reality display a part of a gas turbine engine, and a measurement of "120 mm" between two rivets may be overlaid directly onto the part of the image showing the two rivets.

Although the above description has related to the provision of an inspection system for use within a machine, such as an aircraft propulsion system, which may be a gas turbine engine or, for example, a hybrid gas-electric propulsion system, it should be appreciated that variations of the inspection system may be suitable for other uses.

For example, an inspection system may be configured for use within a human or animal body. It should be appreciated that an inspection system for such a different use may differ from one for use within a machine. By way of example only, it should be appreciated that the requirements for a covering, where used, would differ. For example, there would likely be no requirement for the covering of an inspection system for use within a human or animal body, where used, to be thermally resistant and/or electrically resistant. However, it would likely be desirable for covering to be at least fluid impermeable to separate the user's hand from blood within the human or animal body being inspected. As a further example, a sensor configured to detect sound waves for use within an inspection system to be used within a human or animal body may be specifically configured to detect characteristic sounds that may be expected within a human or animal body, such as sounds of breathing, heartbeats, and/or muscular convulsions.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An inspection system for mounting on a user's hand, the inspection system comprising:

an imaging unit comprising two sub-units, the first sub-unit being configured to provide images from a first point of view and the second sub-unit being configured to provide images from a second point of view; and a measuring unit configured to provide data relating to a physical property measured at a measurement location on the user's hand;

wherein the imaging unit has a separation sensor configured to measure the separation between the two sub-units of the imaging unit;

wherein the separation sensor comprises two contact pads, each of the contact pads having a contact surface which is substantially fixedly positioned at a respective known displacement relative to a respective sub-unit of the imaging unit; and wherein, when the two contact surfaces are brought into contact with each other, the separation between the two sub-units of the imaging unit is determined by the sum of the known displacements between the contact surfaces and the respective sub-units of the imaging unit.

2. The inspection system of claim 1, wherein the imaging unit is configured such that the optical axes of the sub-units of the imaging unit are substantially parallel.

3. The inspection system of claim 1, wherein the contact pads of the separation sensor are magnetically attracted to each other.

4. The inspection system of claim 1, wherein the separation sensor is configured to sense whether the two contact surfaces are in contact.

5. The inspection system of claim 4, wherein the imaging unit is configured to:

when the separation sensor senses that the two contact surfaces are in contact, output a stereographic image based on the images provided by the imaging unit; and/or when the separation sensor senses that the two contact surfaces are not in contact, combine an image provided by one sub-unit of the imaging unit with that provided by the other sub-unit of the imaging unit to produce a combined image with an enlarged field of view.

6. The inspection system of claim 1, wherein the separation sensor comprises a camera substantially fixedly positioned at a known displacement relative to one of the sub-units of the imaging unit, and a fiducial marker substantially fixedly positioned at another known displacement relative to the other of the sub-units; and wherein, when the fiducial marker is within the field of view of the camera of the separation sensor, the separation sensor is configured to compute the separation between the two sub-units of the imaging unit based on an image of the fiducial marker captured by the camera.

7. The inspection system of claim 1, wherein the separation sensor comprises two inertial measurement units, each inertial measurement unit being substantially fixedly positioned relative to a respective sub-unit of the imaging unit; and wherein the separation sensor is configured to compute the separation between the two sub-units of the imaging unit based on the output of the two inertial measurement units.

8. The inspection system of claim 1, wherein the imaging unit is configured to:

when the separation between the two sub-units of the imaging unit is less than a predetermined threshold, output a stereographic image based on the images provided by the imaging unit; and/or when the separation between the two sub-units of the imaging unit is no less than the predetermined threshold, combine the images provided by one sub-unit of the imaging unit with those provided by the other sub-unit of the imaging unit to produce a combined image with an enlarged field of view.

9. The inspection system of claim 1, wherein the imaging unit comprises more than two sub-units configured to provide images from different points of view, and the separation sensor is configured to measure more than one separation amongst the sub-units of the imaging unit.

10. The inspection system of claim 1, configured to compute, based on the images provided by the two sub-units of the imaging unit, a dimension of an object or between objects captured in the images.

11. The inspection system of claim 1, configured to compute, based on the images provided by the two sub-units, a three-dimensional map of the space captured in the images.

12. The inspection system of claim 1, wherein each sub-unit of the imaging unit comprises at least one of: a camera, a 360° camera, a wavelength filtered camera, a thermal camera, a zoom camera, a macro camera, a stereo camera, a dichroic camera, and an ultrasound receiver.

13. The inspection system of claim 1, wherein the measuring unit, comprises at least one of:

a sensor configured to measure a temperature at a measurement location on a user's hand;

a sensor configured to measure a force exerted on a measurement location on a user's hand;

a sensor configured to measure the acceleration of a measurement location on a user's hand;

a sensor configured to measure the position of a measurement location on a user's hand;

a sensor configured to measure ionizing radiation at a measurement location on a user's hand;

a sensor configured to measure at least one of the direction and strength of a magnetic field and/or an electric field at a measurement location on a user's hand;

a sensor configured to measure an eddy current in a material in proximity to a measurement location on a user's hand;

a sensor configured to detect sound waves at a measurement location on a user's hand;

a sensor configured to measure the separation between two measurement locations on a user's hand; and a sensor configured to measure at least one of the voltage, electric current and the electrical resistance between two measurement locations on a user's hand.

14. The inspection system of claim 1, wherein the measuring unit includes a sensor configured to provide a measurement between two measurement locations, each of the two measurement locations being located on a digit of the user's hand, a tip of a digit of the user's hand, on the phalanges of a digit of a user's hand, on the palm of the user's hand or on the back of the user's hand.

15. The inspection system of claim 1, further comprising:

a fluid dispensing unit configured to supply a fluid from at least one dispensing location located on the user's hand;

a fluid absorbing unit configured to absorb fluid at a location on at least one of a digit of the user's hand, a tip of a digit of the user's hand, on the phalanges of a digit of a user's hand, the palm of the user's hand and the back of the user's hand; and/or at least one illuminator configured to emit at least one of visible light, infrared and ultraviolet radiation.

16. The inspection system of claim 1, further comprising a controller, configured to receive data from at least one of the imaging unit and the measuring unit and to output corresponding information to a user interface.

17. The inspection system of claim 16, wherein the user interface comprises a display configured to display an image based on data from the imaging unit, the display being optionally stereographic, mountable on a user's head, an augmented reality display, and/or configured to display dimensional information on the display.

18. The inspection system of claim 1, wherein the inspection system is configured for use within a machine.

19. A method of inspecting and/or servicing a machine, the method comprising the steps of:
- mounting an inspection system of claim 1 on a user's hand; and
- inserting the user's hand into the machine to inspect and/or service the machine.

* * * * *